DIODE MOUNT HAVING INTEGRAL RESONANT CIRCUIT

Filed May 23, 1969

INVENTORS H.E. BRENNER
R. EDWARDS
A. J. GIGER
BY Roy M. Porter Jr.
ATTORNEY

United States Patent Office 3,553,610

Patented Jan. 5, 1971

3,553,610

DIODE MOUNT HAVING INTEGRAL RESONANT CIRCUIT

Helmut E. Brenner, Middletown, Roger Edwards, Gillette, and Adolf J. Giger, Holmdel, N.J., assignors to Bell Telephone Laboratories, Incorporated, Murray Hill and Berkeley Heights, N.J., a corporation of New York Filed May 23, 1969, Ser. No. 827,431

Int. Cl. H01p *7/06;* H01l *5/02;* H03b *7/14*

U.S. Cl. 333—83 9 Claims

ABSTRACT OF THE DISCLOSURE

A semiconductor mounting package incorporating its own resonant circuit is disclosed for millimeter waveguide use. The apparatus comprises a metal stud having two spaced metal projections formed on its end surface, a two-terminal semiconductor device mounted on the surface between the projections, and a metal ribbon connecting the upper device terminal to a source of bias energy. The ribbon, the projections, the stud surface, and means providing a low impedance path for millimeter wave energy across the gaps between the ribbon and the projections form a resonating lumped inductance cavity around the device. The impedance of this packaged circuit is of relatively simple form, approximately that of a parallel resonant circuit comprising the device and the lumped cavity inductance. With its use oscillators have been built having good modulation sensitivity and fundamental frequencies in the range of 60 gHz.

BACKGROUND OF THE INVENTION

The present invention relates to a semiconductor mounting package incorporating a resonant circuit and designed for waveguide use in the millimeter wave region.

A wide variety of semiconductor devices, including varactors, tunnel diodes, PIN diodes and IMPATT diodes, are mounted in waveguide resonant circuits to perform various functions. These devices are normally contained between a pair of spaced conducting terminals and, properly biased, exhibit a characteristic impedance. For use they are physically positioned within a waveguide cavity or iris and biased into their operating condition. The mounting system used with a particular device must have a reactance which balances the reactance of that device to produce a resonant circuit at the desired frequency of operation.

Many suitably biased semiconductor devices including varactors and IMPATT diodes exhibit an equivalent reactance which is capacitive, and when one of these is the active element in a waveguide resonant circuit the remaining, passive elements must have a net inductive reactance. Some inductance may be supplied by the bias line which extends into the cross sectional area of the mounting cavity to make contact with one terminal of the device. If this line is inserted parallel to the direction of the electric field vectors, the E-plane direction, it appears to electromagnetic energy in the guide as an inductance in series with the device. The component of inductance produced by the E-plane bias line is difficult to calculate and is unavoidable. The amount of this inductance is an inverse function of the H-plane width of the line, its width parallel to the direction of the magnetic field vectors. Also, it is well known in the art that the inductive reactance presented to energy in a guide by a waveguide iris is inversely related to the amount the side walls of the iris restrict the guide cross section in the H-plane direction, parallel to the wide wall of the guide.

Since the device is connected across the iris, any inductance caused by its side walls will be in parallel with the device.

Therefore, changes in the H-plane dimensions of the bias line and the mounting iris alter the inductance of the circuit mounted in the guide. According to the familiar equation.

$$\text{frequency} = \frac{1}{2\pi\sqrt{LC}} \tag{1}$$

(where L and C represent respectively the circuit inductance and capacitance), changes in inductance cause opposite-signed changes in frequency. If capacitance is constant, as in a DC biased IMPATT diode or varactor, circuit inductance must be decreased to produce a higher resonant frequency.

To a point alterations in dimensions of the prior art cavity and bias line can be effected to produce the proper value of inductance. As higher frequencies are sought, the side walls of the cavity are extended inward, increasing the H-plane constriction of the guide and decreasing the parallel inductance. At some point, however, the side walls physically meet the bias line, and to achieve still further reductions in the parallel inductance, it is necessary to make the line thinner. But making the line thinner may be undesirable for other reasons, and in any case increases the series inductance contributed by the line to the overall circuit. In sum, the prior art arrives at a Hobson's choice. This stalemate has hampered attempts to achieve operation in the millimeter wave region with iris type resonant cavities.

SUMMARY OF THE INVENTION

The present invention permits higher frequency waveguide operation by reducing the total inductance of the resonant circuit external to the semiconductor device. The basic element is a cavity of novel design which is contained within a rigid package with the device and which may accurately be treated as a lumped reactance loop presenting a variable inductance to the device. In a preferred embodiment, the package is formed on a metal stud having two spaced metal projections or bosses on its end surface. The stud is mounted in one wall of a conductive waveguide housing so that its end surface lies in the plane of that wall and the projections extend across the guide nearly to the opposite wall. The semiconductor device is positioned on the end surface of the stud between the projections with its lower terminal in contact with the stud surface and its upper terminal facing the opposite wall. A bias line extends through an insulated opening in that opposite wall to the edge of the guide, and contact between it and the upper device terminal is made by a metal ribbon. The ribbon, together with the projections and the end surface of the study, physically completes a microwave cavity surrounding the semiconductor device, a cavity whose dimensions may be altered to produce a desired inductive reactance. The bottom and top of the cavity are formed respectively by the stud end surface and the metal ribbon. The sides of the cavity are formed by the spaced projections and by a pair of high frequency low impedance paths connecting the tops of the projections and the ends of the metal ribbon. If dielectric spacers are inserted between the ends of the ribbon and the projections, a rigid package is formed which contains the device and its associated resonating cavity.

The bias line is external to the cavity and to the guide and therefore adds no reactance to the circuit. The metal ribbon connecting the line to the device does add some inductance to the circuit, but this effect is substantially smaller than the prior art inductance caused by an E-plane line. In addition, the total reactance of the cavity is accurately adjustable in magnitude, since it may be considered a lumped reactance loop which can be approximated by a step transmission line transforming a short at the outer cavity wall to an inductance at the diode. The net inductance present in this circuit is significantly lower than that reachable by other means compatible with good modulation sensitivity, and accordingly substantially higher frequencies of operation are obtainable.

DETAILED DESCRIPTION

Figure 1:
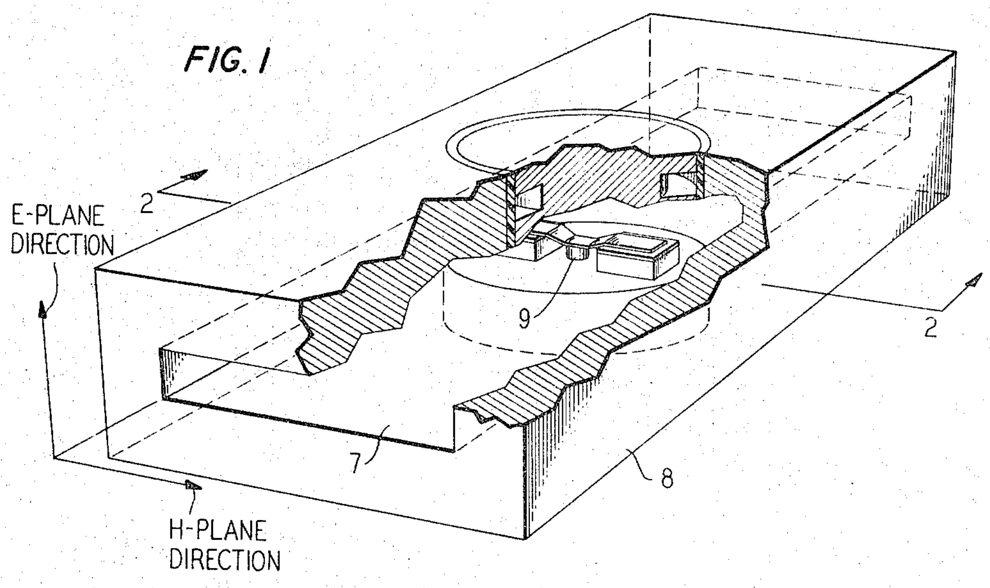
FIG. 1 is a perspective view of a waveguide assembly containing the mounting package of the present invention.

Referring to FIG. 1, housing 8 is a conductive element having a reduced height section of waveguide 7 running axially through it. While the invention to be described may be practiced in a waveguide of standard height, impedance discontinuities are avoided if a reduced height section is employed instead. A semiconductor device 9 is to be coupled to electromagnetic energy in guide 7. In one particularly useful embodiment of the present invention, device 9 is an IMPATT diode, and the invention is used in conjunction with that diode to produce a millimeter wave oscillator having good modulation sensitivity. However, it will become apparent that the particular form of the mounting package has no bearing on the principles of the invention. The only general requirement as to form is that the semiconductor device have two conducting terminals.

Figure 2:
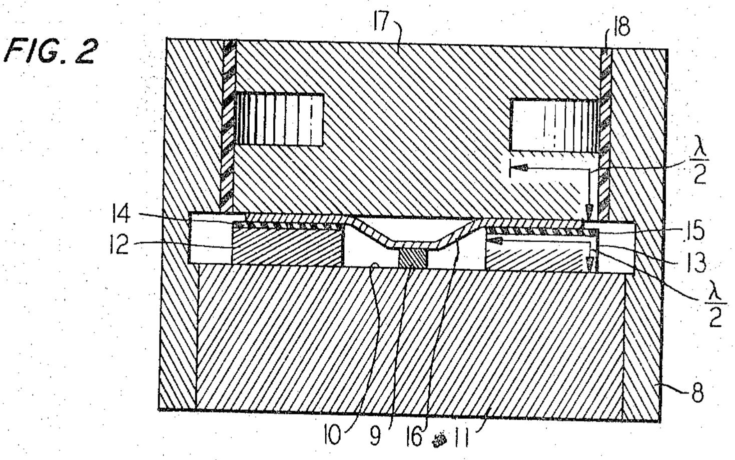
FIG. 2 is an end view taken along line 2—2 in FIG. 1.
Figure 3:
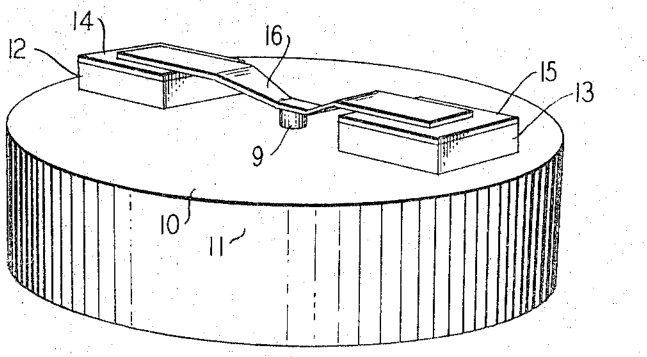
FIG. 3 is a perspective view of the mounting package shown in FIGS. 1 and 2.

Diode 9 is contained within a package shown in FIG. 1, and in more detail in FIGS. 2 and 3. Diode 9 is mounted on one substantially flat end surface 10 of metal stud 11 with its lower terminal in contact therewith and its axis in the E-plane direction. Stud 11 is mounted in housing 8 so that its end surface 10 lies in the plane of the lower wide wall of guide 7. Projections or bosses 12 and 13, taller than diode 9, are formed on that same surface 10 and are dimensioned and spaced so that they extend across the guide nearly to the opposite wide wall and constrict the H-plane dimension of the guide, forming two side walls of a cavity around device 9. The projections may be formed separately and bonded to the surface of stud 11 or may be produced by cutting or die forming a slot in the end of the stud, leaving them on either side. To avoid lossy interfaces and to increase heat conduction, it is preferred that the projections and the stud be of unitary construction. Dielectric spacers 14 and 15, which may be made, for example of quartz, are metallized on at least their top surfaces and bonded respectively to the tops of projections 12 and 13. Metallic ribbon 16 extends between spacers 14 and 15, making contact with the upper terminal of diode 9 and physically completing the package.

In order to seal the cavity electrically at the millimeter operating frequency, short circuits must be placed across the inner edges of dielectric spacers 14 and 15. To do this, use may be made of the transmission lines extending along each of those metallized spacers from their inner to their outer edges, and then down along the outer wall of each projection to surface 10. If the electrical length of each of these transmission lines between a point at the inner edge of each dielectric spacer and a point on the surface of stud 11 near the outer edge of each projection is made to equal one-half wavelength, the short at each point on the stud is transformed to each point on the inner edge of each spacer, thereby electrically sealing the cavity. In principle, quarter wavelength transformations of open circuits may also be used to close the cavity. To achieve the necessary transmission line properties the metallization on spacers 14 and 15 must extend the full width of the underlying projections and to avoid parasitics should have surface areas equal to the areas of the top of projections 12 and 13. Since the lower surfaces of spacers 14 and 15 are respectively in contact with the tops of metal projection 12 or 13, metallization of the lower surfaces may be omitted. And similarly, if ribbon 16 extends across hte full width of the projections, the top metallization may be unnecessary.

This entire package is mounted in one wide wall of housing 8 as shown in FIGS. 1 and 2. DC bias line 17, insulated by dielectric tube 18 from housing 8, is inserted through the opposite wall so that its end surface is even with the top wall of guide 7 and is in contact with the ends of metallic ribbon 16. Line 17 includes a choke section which isolates millimeter frequency energy in guide 7 from the bias section. The electrical length of each portion of this choke, from a point at the lower edge of the line to a point on its narrowed section is adjusted to equal approximately one-half wavelength. This transforms the short at each point on the narrowed section to each point at the lower edge, thereby shorting tube 18 at its lower end for the particular millimeter operating frequency and preventing the bias circuit from having any effect on the resonant cavity.

Electrically, a DC path exists from bias line 17 to ribbon 16, diode 9, stud 11, and housing 8 (ground). A microwave cavity surrounds diode 9, physically comprising the inner walls of projections 12 and 13, the end surface 10 of stud 11 bewteen those projections, and metallic ribbon 16. From the point of view of an electromagnetic wave in the guide, the reactance of the cavity is made up of two parts, the H-plane constriction caused by projections 12 and 13 and the inductance of metal ribbon 16. From the point of view of diode 9, the cavity reactance is produced by ribbon 16, which acts to a good approximaton as a stepped transmission line, transforming the R-F short at the cavity side walls to a desired reactance at the diode. The reactance may be adjusted by varying the dimensions and spacing of the projections 12 and 13 and the shape of ribbon 16.

Since this configuration eliminates the need for bias line 17 to extend into the cavity, projections 12 and 13 may be brought quite close together beneath ribbon 16, resulting in a very small inductance in parallel with diode 9. Since bias line 17 extends through housing 8 just to the boundary of guide 7, it does not appear in the path of the microwave energy in guide 7 and so produces no series inductance. Ribbon 16 does add some series inductance, but because of its shape, that inductance is relatively small. And because the total cavity acts as a lumped reactance loop its reactance as seen by the diode may be controlled. Therefore, the net circuit inductance may be accurately made quite small, and higher resonant frequencies may be obtained.

While an ideal lumped inductance is not practically realizable in the millimeter wave region, the approach taken in the present invention presents an approximation to that ideal when the spacing between projections 12 and 13 is less than one-half wavelength. The inductance produced by this "lumped approach," as contrasted with that produced by a long transmission line, leads to a low Q resonant circuit having high modulation sensitivity, that is, a large change in frequency for a given change in bias current. An IMPATT oscillator built in accordance with the above description experimentally delievered an output power on the order of 200 mw. at 55 gHz. with good modulation sensitivity.

While the present invention has been described in conjunction with an IMPATT oscillator, other uses are foreseen. Varactors, tunnel diodes, PIN diodes and other semiconductors devices may be substituted for the IMPATT diode to produce other useful combinations. It should be understood also that other variations of the present embodiment will not depart from the scope of the disclosed invention. For example, if heat sinking is somehow otherwise accomplished, insulating tube 18 may be placed around stud 11 instead of bias line 17, with no basic change in the circuit operation. Alternatively, the slot can be cut into the lower surface of the bias line instead of the top surface of the mounting stud. Or thirdly, a metal whisker may be used to make contact between the upper terminal of diode 9 and bias line 17 though this method of contact adds some series inductance to the overall circuit much as did the prior art bias line inserted along the E-plane direction. Fourthly solid dielectric spacers 14 and 15 are not essential to the present invention and could be replaced by air gaps, although their presence makes it possible to fabricate the entire assembly shown in FIG. 3 into a package which can be mounted as one piece in housing 8.

It should be further understood that the above-described embodiments are merely illustrative, and that other arrangements may readily be devised by those skilled in the art which do not depart from the spirit and scope of the present invention.

We claim:

1. In combination a conductively bounded rectangular waveguide having respective wide and narrow conductive boundaries, a biased two-terminal semiconductor device having a characteristic reactance, means for coupling the device to the guide at a predetermined high operating frequency comprising means for forming a microwave cavity in the guide comprising a pair of spaced conducting means for restricting the wide dimension of the guide connected to a first of the wide conductive boundaries on either side of the longitudinal center line of the boundary and extending nearly to the opposite wide boundary, means for applying bias energy to the device, and means for providing a low impedance path at the operating frequency between each of the two spaced guide restricting means and the bias applying means, the device being mounted in the cavity between the spaced guide restricting means with a first terminal connected to the bias applying means.

2. The combination as described in claim 1 wherein the dimensions and spacing of the guide restricting means and the dimensions of the bias applying means are adjusted to produce a cavity reactance which resonates with characteristic reactance of the biased device at the predetermined high frequency of operation.

3. The combination described in claim 1 wherein the bias applying means comprises a bias line and a metallic ribbon having its ends connected to the bias line and its middle portion connected to the second device terminal.

4. The combination described in claim 3 wherein solid dielectric spacers are disposed between the ends of the ribbon and the tops of the guide restricting means, whereby a continuous solid package around the device is completed.

5. The combination described in claim 1 wherein the means for providing a low impedance path at the operating frequency between each of the two spaced guide restricting means and the bias applying means comprises a pair of transmission line means, each having a first side connected to one of the guide restricting means and a second side connected to the bias applying means, each transmission line means having a total electrical length equal to one half wavelength at the operating frequency so that each transforms a low impedance path across a first end thereof to the second end thereof located at the edge of the microwave cavity.

6. The combination described in claim 3 wherein the bias line is separated from the guide walls by a dielectric tube, including means for providing a low impedance path at the operating frequency across the lower end of the tube comprising transmission line means enclosing the tube and having a first side connected to the bias line and a second side connected to the guide wall, the transmission line means having a total electrical length equal to one half wavelength at the operating frequency so that it transforms a low impedance path across a first end thereof to the second end thereof located at the lower end of the dielectric tube.

7. In combination a waveguide for electromagnetic wave energy having pairs of wide and narrow conductive boundaries, means for forming within a short section of the guide an effective microwave cavity comprising a pair of spaced conductive bosses each extending from one of the wide conductive boundaries on either side of the longitudinal center line of the boundary to ends adjacent to but spaced from the opposite wide boundary, a conductive member located between the bosses, means for providing a low impedance path to both of the bosses from the conductive member for the wave energy but a high impedance path for direct currents, a two-terminal semiconductor device located within the cavity, the device having a first terminal connected to the conductive member, and means for applying a direct current to the conductive member.

8. A packaging system for a waveguide mounted biased two-terminal semiconductor device having a characteristic reactance comprising a conductive stud having a substantially flat end surface, the device being mounted on the surface with a first terminal in contact therewith, two conductive projections, each taller than the device, formed on the end surface of the stud on opposite sides of the device, a pair of dielectric spacers each mounted on the top of one projection, means for providing a low impedance path at a predetermined operating frequency across the inner edge of each dielectric spacer, a conductive member having its ends connected to the top of the means for providing a low impedance path and its middle portion connected to the second device terminal, the conductive member, the means for providing a low impedance path across the inner edge of each dielectric spacer, the projections and the end surface of the stud forming a cavity surrounding the device having a reactance which resonates with the characteristic reactance of the device at the operating frequency of the guide.

9. In combination, a conductively bounded rectangular waveguide having respective wide and narrow cross sectional dimensions, a biased two-terminal semiconductor device having a characteristic reactance, means for coupling the device to the guide at a predetermined high operating frequency comprising an electrically conductive member having a substantially flat-bottomed slot formed perpendicularly in one end surface thereof, the depth of the slot being adjusted so that when the member is inserted in one wide boundary of the guide, with the bottom of the slot in the plane of the boundary, the remaining portions of the end surface on either side of the slot extend across the guide nearly to the opposite wide boundary, the device being mounted in the slot with a first terminal in contact with the bottom of the slot, the coupling means further comprising means for electrically connecting the second terminal of the device to a source of bias energy and means for providing a low impedance path at the operating frequency between the remaining portions of the end surface and the bias connecting means, the bias connecting means, the side walls and bottom of the slot, and the low impedance path providing means defining a microwave cavity enclosing the device and having a reactance which resonates with the characteristic reactance of the device at the operating frequency.

References Cited

UNITED STATES PATENTS

| | | | |
|---|---|---|---|
| 3,320,497 | 5/1967 | Neuf | 317—234/5.4 |
| 3,221,277 | 11/1965 | Haver | 333—83 |

FOREIGN PATENTS

| | | | |
|---|---|---|---|
| 955,332 | 4/1964 | Great Britain | 333—98 |

ELI LIEBERMAN, Primary Examiner

W. H. PUNTER, Assistant Examiner

U.S. Cl. X.R.

333—98; 317—234; 331—97, 103; 329—161